United States Patent
Pham et al.

(10) Patent No.: US 9,243,346 B2
(45) Date of Patent: *Jan. 26, 2016

(54) PROCESS OF ELECTROSPINNING CORE-SHEATH FIBERS

(71) Applicant: Arsenal Medical, Inc., Watertown, MA (US)

(72) Inventors: Quynh Pham, Metheun, MA (US);
Upma Sharma, Somerville, MA (US);
John Marini, Weymouth, MA (US);
Xuri Yan, Brighton, MA (US); Robert Mulligan, Arlington, MA (US); Toby Freyman, Lexington, MA (US)

(73) Assignee: Arsenal Medical, Inc., Watertown, MA (US)

(*) Notice: Subject to any disclaimer, the term of this patent is extended or adjusted under 35 U.S.C. 154(b) by 144 days.

This patent is subject to a terminal disclaimer.

(21) Appl. No.: 14/053,994

(22) Filed: Oct. 15, 2013

(65) Prior Publication Data

US 2014/0103583 A1   Apr. 17, 2014

Related U.S. Application Data

(60) Provisional application No. 61/713,785, filed on Oct. 15, 2012, provisional application No. 61/723,882, filed on Nov. 8, 2012.

(51) Int. Cl.
| | |
|---|---|
| *B29C 47/92* | (2006.01) |
| *D01D 5/00* | (2006.01) |
| *D01D 5/34* | (2006.01) |

(52) U.S. Cl.
CPC ............ *D01D 5/0015* (2013.01); *D01D 5/0038* (2013.01); *D01D 5/0069* (2013.01); *D01D 5/34* (2013.01)

(58) Field of Classification Search
CPC ...... B29C 47/92; D01D 5/003; D01D 5/0038; D01D 5/0046
USPC .................... 264/40.1, 172.15, 465
See application file for complete search history.

(56) References Cited

U.S. PATENT DOCUMENTS

| | | | |
|---|---|---|---|
| 2012/0025429 A1* | 2/2012 | Ishikawa et al. | 264/412 |
| 2012/0193836 A1* | 8/2012 | Sharma et al. | 264/465 |
| 2012/0242010 A1* | 9/2012 | Ishikawa et al. | 264/479 |

FOREIGN PATENT DOCUMENTS

| | | | |
|---|---|---|---|
| WO | WO-2011058708 A1 * | 5/2011 | |
| WO | WO-2011070761 A1 * | 6/2011 | |

* cited by examiner

*Primary Examiner* — Leo B Tentoni
(74) *Attorney, Agent, or Firm* — Kacvinsky Daisak Bluni PLLC-Boston

(57) ABSTRACT

Systems and methods for electrospinning of core-sheath fibers are provided. The systems and methods achieve optimization of a shear stress that exists at a fluid boundary between core and sheath polymer solutions, by varying certain parameters of an electrospinning apparatus and/or the solutions used therewith.

11 Claims, 13 Drawing Sheets

| FIXTURE | OBSERVATIONS | REPRESENTATIVE TAYLOR CONE IMAGE |
|---|---|---|
| 1 mm SPACING | - CLEAR CORE-SHEATH TAYLOR CONE FOR BOTH SYSTEMS | 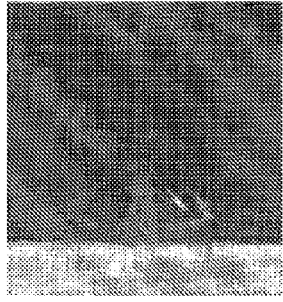 |
| 3 mm SPACING | - MIXING OF CORE AND SHEATH FLUIDS FOR BOTH SYSTEMS<br>- QUALITY OF CORE-SHEATH TAYLOR CONE IS NOT GOOD FOR BOTH SYSTEMS | 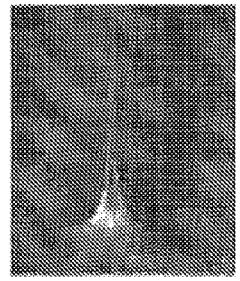 |
| 6 mm SPACING | - MIXING OF CORE AND SHEATH FLUIDS FOR BOTH SYSTEMS<br>- QUALITY OF CORE-SHEATH TAYLOR CONE IS NOT GOOD FOR BOTH SYSTEMS | 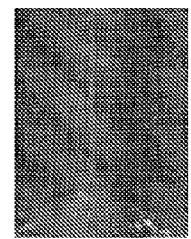 |

FIG. 10B

PROCESS OF ELECTROSPINNING CORE-SHEATH FIBERS

CROSS-REFERENCE TO RELATED APPLICATIONS

This application claims priority to (a) U.S. Provisional Patent Application No. 61,713,785 by Pham et al. entitled "Systems and Methods for Facilitating the Generation of Core-Sheath Taylor Cones in Electrospinning" filed Oct. 15, 2012, and (b) U.S. Provisional Patent Application No. 61/723,882 by Pham et al. entitled "Systems and Methods for Facilitating the Generation of Core-Sheath Taylor Cones in Electrospinning" filed Nov. 8, 2012. The entire disclosure of each of the foregoing references is incorporated by reference herein for all purposes.

STATEMENT REGARDING FEDERALLY SPONSORED RESEARCH OR DEVELOPMENT

This invention was made with Government support under 70NANB11H004 awarded by the National Institute of Standards and Technology. The Government has certain rights in the invention.

TECHNICAL FIELD

The present invention relates to systems and methods for the manufacturing of microscale or nanoscale concentrically-layered fibers by electrospinning, and more particularly to systems and methods for facilitating the initiation and stabilization of core-sheath Taylor cones during electrospinning.

BACKGROUND

Macro-scale structures formed from concentrically-layered nanoscale or microscale fibers ("core-sheath fibers") such as AxioCore® fibers commercialized by Arsenal Medical (Watertown, Mass.) are useful in a wide range of applications including drug delivery, tissue engineering, nanoscale sensors, self-healing coatings, and filters. On a commercial scale, the most commonly used techniques for manufacturing core-sheath fibers are extrusion, fiber spinning, melt blowing, and thermal drawing. None of these methods, however, are ideally suited to producing drug-loaded core-sheath fibers, as they all utilize high temperatures which may be incompatible with thermally labile materials such as drugs or polypeptides. Additionally, fiber spinning, extrusion and melt-blowing are most useful in the production of fibers with diameters greater than ten microns.

Core-sheath fibers with diameters less than 20 microns can also be produced by electrospinning, in which an electrostatic force is applied to a polymer solution to induce the formation of electrospinning jets which harden to form very fine fibers. Conventional electrospinning methods utilize a needle to supply a polymer solution, which, upon activation of an electric field, is then ejected into a continuous stream toward a grounded collector. As the jet stream travels in the air, solvent evaporation occurs resulting in a single long polymer fiber. Core-sheath fibers have been produced by electrospinning using coaxial needles, in which concentric needles are used to eject different polymer solutions: the innermost needle ejects a solution of the core polymer, while the outer needle ejects a solution of the sheath polymer.

Coaxial electrospinning has been used in the fabrication of core-sheath fibers for drug delivery in which the drug-containing layer (the "core") is confined to the center of the fiber and is surrounded by a drug-free layer (the "sheath"). The sheath then serves as a diffusion barrier to a therapeutic agent in the core. Thus, release rates of the drug can be tightly controlled by varying the thickness, composition, and degradation profile of the sheath material as well as composition and concentration of the drug in the core Additionally, core-sheath fibers can be used for tissue engineering (e.g., incorporation of therapeutics to affect cell growth), filtration (e.g., by incorporation of self-cleaning compounds such as titanium dioxide), sensors (e.g., creation of hollow fibers to allow measurement of small analyte volumes), and as self-healing materials (e.g., spontaneous repair of surfaces with release of core contents). Core-sheath fibers can also be used as a way to create fibers from materials that would be otherwise unable to be electrospun (e.g., polymer pre-cursors such as poly(glycerol sebacic acid) or insulating materials such as Teflon). To do so, the material incompatible with electropsinning is confined in the center of the fiber and is surrounded by a material optimized for electrospinning; upon completion of the process the surrounding sheath material is removed (e.g., dissolved or melted away).

The use of a conventional coaxial needle electrospinning apparatus is depicted in FIG. 1A. The two concentric needles 110 separately deliver the core and sheath solutions—the core solution is delivered through the inner needle 112 whereas the sheath solution is delivered through the outer needle 114. A grounded collector (not shown) is placed at a distance from the needle, and a potential is generated between the collector and the concentric needles 110 with a magnitude and direction sufficient to impel both solutions from the needles in a continuous stream toward the grounded collector. Each stream forms a single core-sheath fiber, so the throughput of coaxial electrospinning methods is inherently limited by the fact that only one stream can be produced by each concentric needle pair 110.

To increase throughput, coaxial nozzle arrays have been utilized, but such arrays pose their own challenges, as separate nozzles may require separate pumps, the multiple nozzles may clog, and interactions between nozzles may lead to heterogeneity among the fibers collected. Another means of increasing throughput, which utilizes a spinning drum immersed in a bath of polymer solution, has been developed by the University of Liberec and commercialized by Elmarco, S.R.O. under the mark Nanospider®. The Nanospider® improves throughput relative to other electrospinning methods, but to date core-sheath fibers have not been fabricated using the Nanospider®.

A high-throughput approach for generating the core-sheath fibers, which has been commercialized by Arsenal Medical (Watertown, Mass.) (the "Arsenal Electrospinning Technology"), utilizes a plurality of elongate vessels with narrow apertures or slits which are aligned to co-localize different materials to multiple sites that form Taylor cones, thereby promoting the formation of multiple electrospinning jets and electrospun fibers with high throughput, as discussed in, e.g., U.S. patent application Ser. No. 13/362,467, filed on Jan. 31, 2012 (U.S. Patent App. Pub. No. 2012/0193836), the entire disclosure of which is hereby incorporated by reference.

FIG. 1B depicts an apparatus 120 implementing the Arsenal Electrospinning Technology. The apparatus 120 includes an elongate vessel 122 having one or more elongate apertures or slits 124 extending along at least a portion of the vessel 122; each slit surface includes one or more slits 126. A positive terminal of a power supply (not shown) is connected to the elongate vessel 122 directly or via a wire such that a potential difference exists between the elongate vessel 122 and a grounded collector 128. Upon application of a voltage, the core polymer solution 130 becomes charged; the charged polymer solution is acted upon by an electrostatic force impelling the core polymer solution 130 away from the elongate vessel 122 that counteracts the surface tension thereof. When the applied voltage is above a critical threshold value, Taylor cones 132 and electrospinning jets (or jets) 134 form at the exposed slit surfaces; the jets 134 are then attracted toward the collector 128, thereby forming homogeneous fibers.

The Arsenal Electrospinning Technology facilitates the manufacture of core-sheath fibers at high throughput by allowing significantly larger volumetric flow rates relative to needle-based systems 132, thus addressing a long-standing need in the field for efficient, high-throughput production of electrospun core-sheath fibers. However, further improvements in the efficiency of the Arsenal Electrospinning Technology could facilitate the use of core-sheath fibers in many applications, and could potentially significantly reduce the cost of producing such fibers.

SUMMARY OF THE INVENTION

The present invention, in its various embodiments, addresses the ever-present need in the field for increased efficiency in core-sheath fiber production by providing improved systems and methods for high-throughput production of electrospun core-sheath fibers. Embodiments of the invention improve the consistency of core- and sheath-polymer incorporation into Taylor cones and/or electrospinning jets and electrospun fibers by optimizing shear stresses applied at fluid boundaries between core- and sheath-solutions at sites of Taylor cone initiation.

In one aspect, the invention relates to a method for forming an electrospun core-sheath fiber that includes providing an apparatus that includes first and second vessels defining first and second elongate apertures, respectively, which are aligned with one-another. The apparatus also includes a grounded collector at a distance from the apertures. According to embodiments of the invention, a first flowable material comprising a core polymer and a second flowable material comprising a sheath polymer are flowed into the first and second vessels, then an electrical potential is created between the apertures and the grounded collector, with potential sufficient in magnitude and orientation to initiate and sustain multiple electrospinning jets. The method also includes optimizing a shear stress generated at a fluid interface such that a desired ratio of core to sheath polymer is achieved in the resulting electrospinning jets; this optimization occurs through the selection of appropriate parameters such as length or width of the first and/or second apertures and velocity or viscosity of the first and/or second flowable materials. In various embodiments, the first flowable material exits the first aperture at a first velocity, while the second flowable material exits the second aperture at a second velocity, and the first velocity can be about 1.3 times, 2.25 times or 2.5 times greater than the second velocity, and may vary during the application of the electrical potential. In some cases, the first and second elongate apertures are nested and aligned along a single central axis, and the width of the first aperture is optionally about half of the width of the second aperture. The first and second elongate apertures can have the same length, or they may have different lengths. The first vessel is optionally nested inside of the second vessel, in which case the first and second apertures are parallel so that material that is ejected from the first aperture must also pass through the second aperture on the way to the collector. The first and second apertures are, in certain embodiments of the method, co-planar, while in other instances they are offset by about 1 mm, in which case the first vessel and the first aperture are optionally submerged in the second flowable material. In some cases, the first and second flowable materials are characterized by particular viscosities, and the first flowable material is less viscous than the second flowable material.

In another aspect, the invention relates to an apparatus for high-throughput electrospinning of core-sheath fibers that includes first and second elongate vessels having first and second elongate apertures, respectively. The first and second elongate apertures are aligned about a single central axis, each of the vessels is in fluid communication with a fluid source that is optionally filled with first and second flowable materials comprising a core and a sheath polymer, respectively, and the apparatus includes a plurality of valves or other control means for providing the first and/or second flowable materials at predetermined rates. In some cases, the first and second vessels are nested, and the apparatus includes means for adjusting a height of the first vessel and the first aperture relative to the second aperture, thereby controlling the depth at which the first vessel and the first aperture are submerged within the second flowable material in the second vessel. In some instances, the first and second vessels are wedge-shaped, and the elongate apertures are positioned at apexes of the vessels.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 10B shows taylor cones generated in the embodiments depicted in FIG. 10A.

DETAILED DESCRIPTION

Figure 1A:
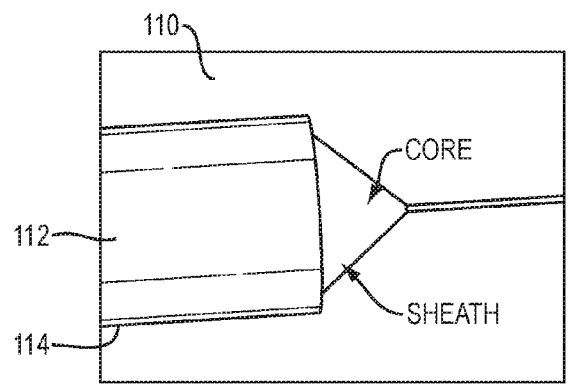
FIGS. 1A-1B include schematic illustrations of examples of electrospinning setups.
Figure 1B:
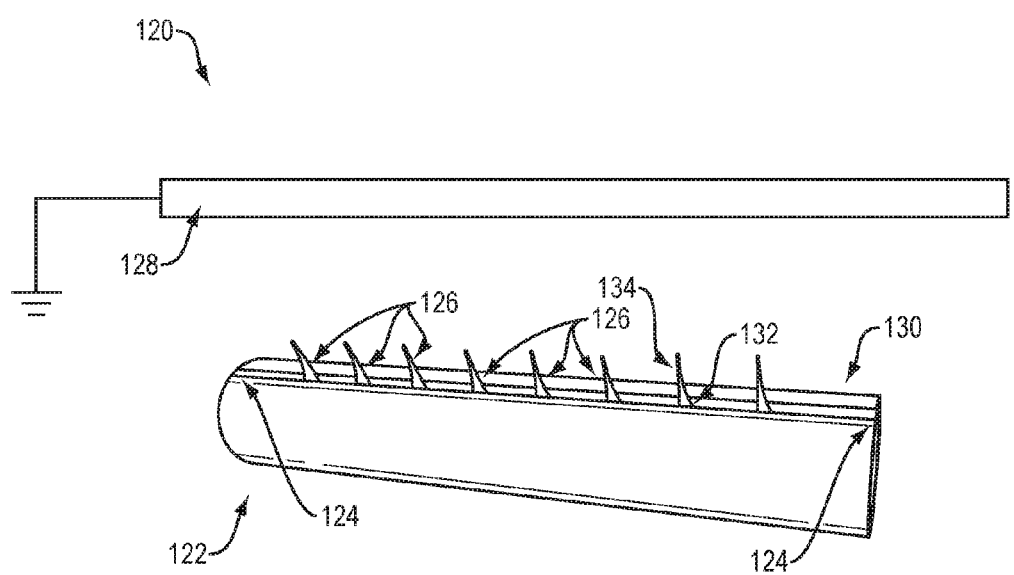
Figure 2:
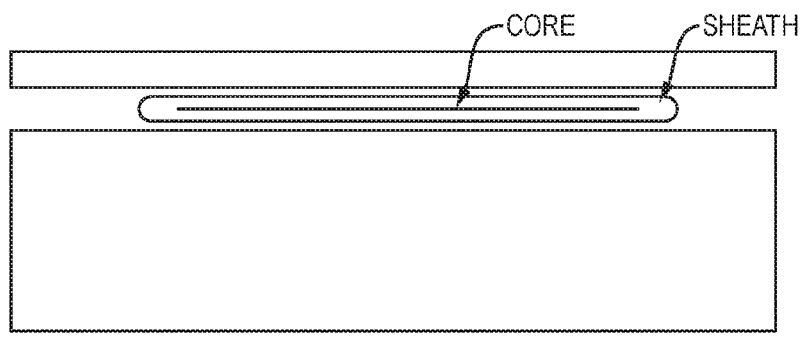
FIG. 2 includes an exemplary schematic illustration of an embodiment of the invention.
Figure 3A:
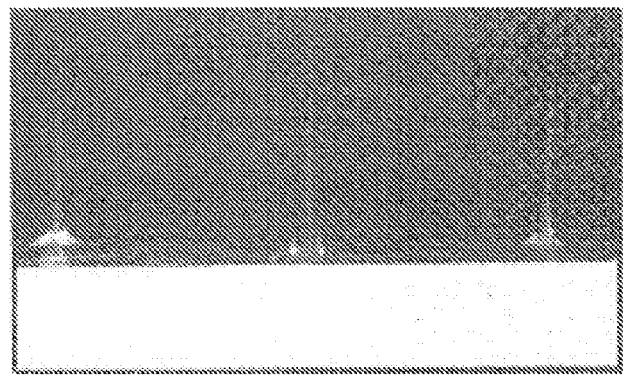
FIGS. 3A-B include examples of controlling the generation of core-sheath Taylor cones to facilitate the formation of core-sheath fibers.
Figure 3B:
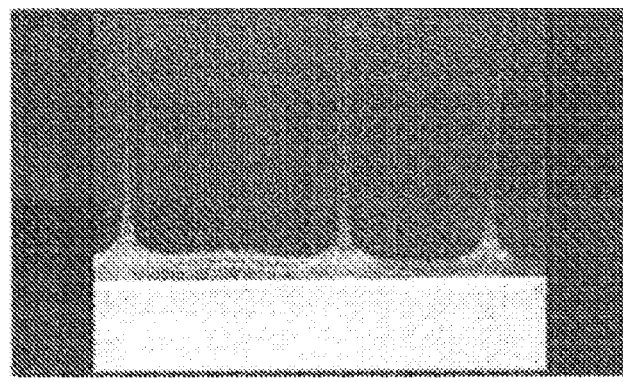

FIG. 2 illustrates a top view of one embodiment of a system that generates core-sheath fibers using a needleless, core-sheath electrospinning process. The core and sheath solutions are first delivered to a slit surface; at the slit surface, a fluid meniscus forms and numerous electrospinning jets may initiate at one or more slits upon activation of an external electric field. In various embodiments, controlling the generation of core-sheath Taylor cones at the fluid meniscus facilitates the formation of core-sheath fibers. For example, upon generating distinct Taylor cones, as shown in FIG. 3A, in the needleless electrospinning process, core-sheath jets and fibers are subsequently created.

Figure 4A:
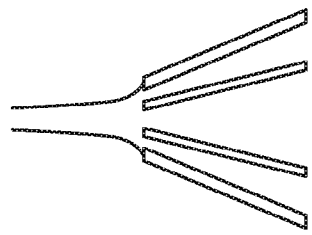
FIGS. 4A-4D include exemplary schematic illustrations of an embodiment of the invention wherein flow rates of material to the core slit and sheath slit surfaces are different to form a core-sheath fiber.
Figure 4B:
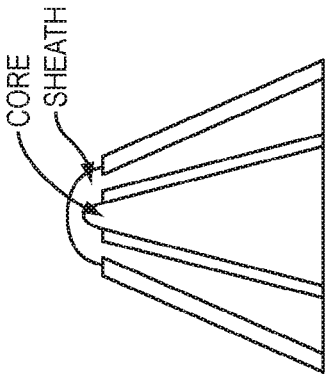
Figure 4C:
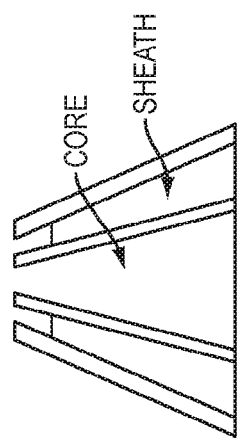
Figure 4D:
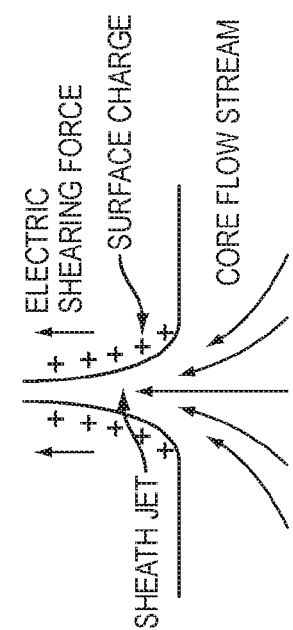

FIG. 4A-4D schematically depict core and sheath polymer solutions delivered to the core and sheath slits, respectively, through the respective features using, for example, syringe pumps. In one embodiment, the flow rate of the sheath solution that fills the left and right channels is relatively faster than that of the core solution (FIG. 4A); as the sheath solution from the two channels merges at the top of the slit surface and bridges the gap therebetween, a fluid meniscus is created under the force of surface tension (FIG. 4B). Upon applying a potential voltage to the slit fixtures, the sheath polymer solution becomes charged; the induced charges may accumulate on the outer surface of the sheath solution (FIG. 4C). As a result, sheath jets may be initiated when a critical potential has been reached. In addition, the pressure of the internal core fluid at the locations where the sheath solution jets are formed may drop allowing the core fluid to be pulled by the applied electric field (FIG. 4C). Because the internal core solution flows towards locations having a relative lower pressure, under the shear forces of the sheath solution, a core-sheath Taylor cone may be generated (FIG. 4D).

Figure 5A:
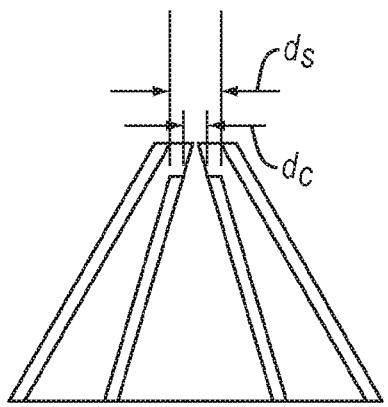
FIGS. 5A-C include exemplary schematic illustrations of embodiments of the invention wherein fixture variables are changed to form core-sheath fibers, including slit width, core and sheath flow velocity, and length of core and sheath slits.
Figure 5B:
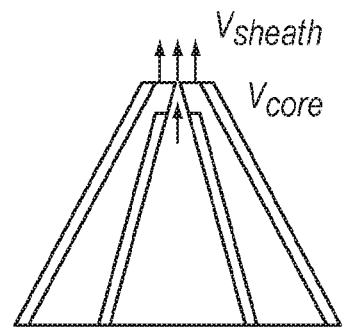
Figure 5C:
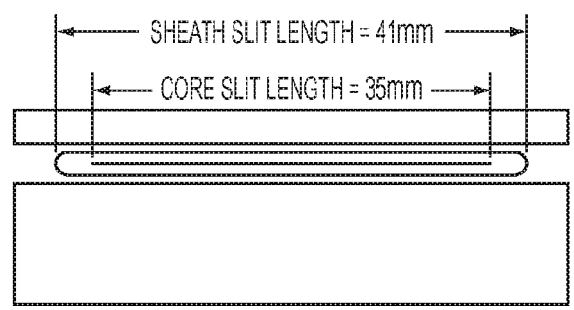
Figure 6A:
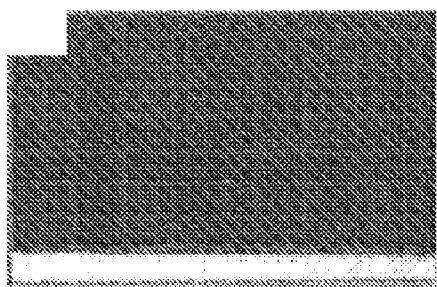
FIGS. 6A-D illustrate some embodiments wherein the sheath flow rate is higher than the core flow rate.
Figure 6B:
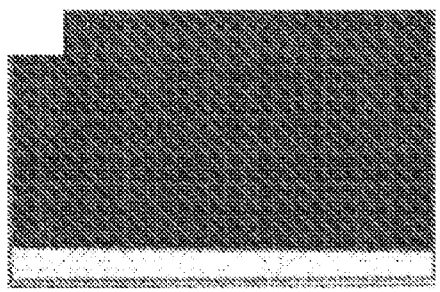
Figure 6C:
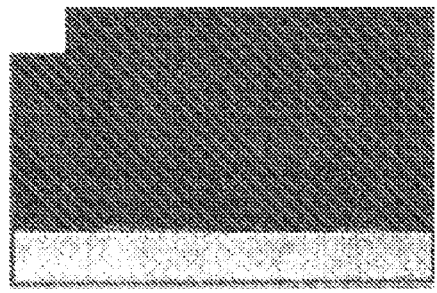
Figure 6D:
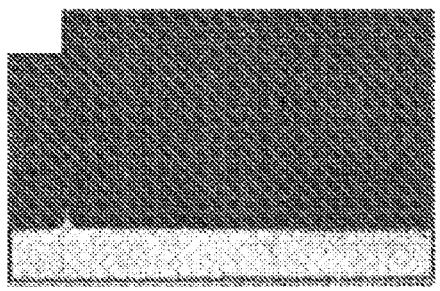
Figure 7A:
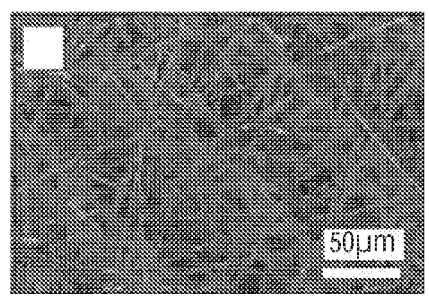
FIGS. 7A-D illustrate core sheath fibers as formed by the embodiments of the invention with a drug core enclosed by a polymer sheath.
Figure 7B:
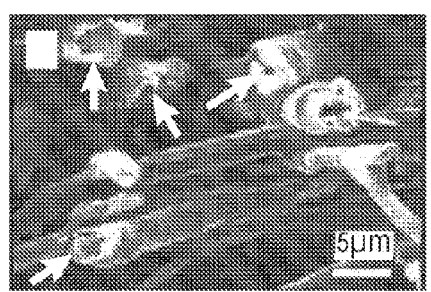
Figure 7C:
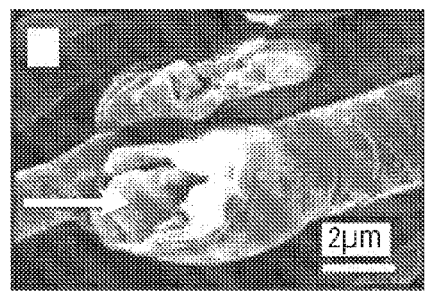
Figure 7D:
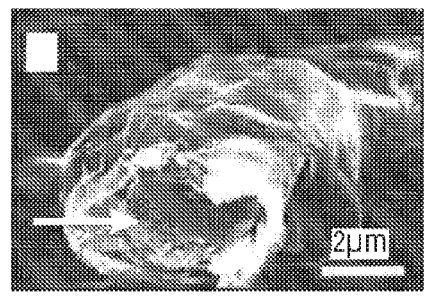
Figure 8A:
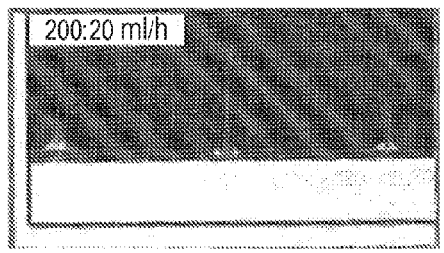
FIGS. 8A-F illustrate some embodiments where the core solution flow rates and velocities are varied.
Figure 8B:
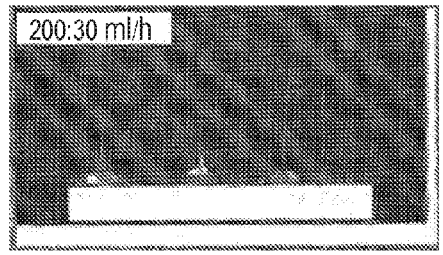
Figure 8C:
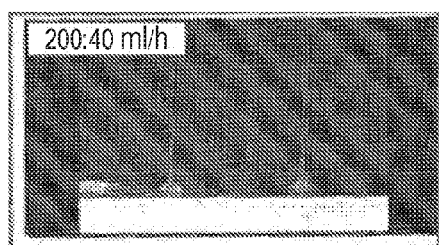
Figure 8D:
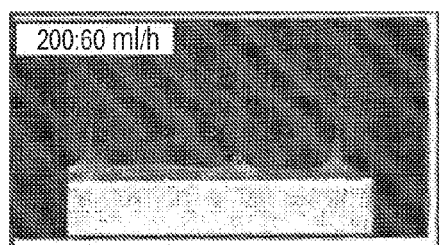
Figure 8E:
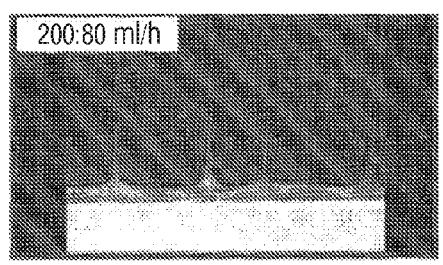
Figure 8F:
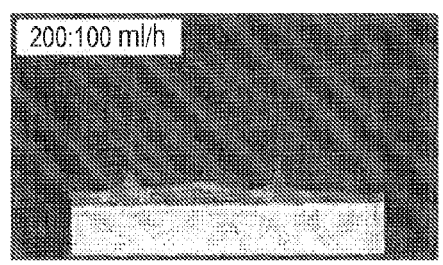
Figure 9A:
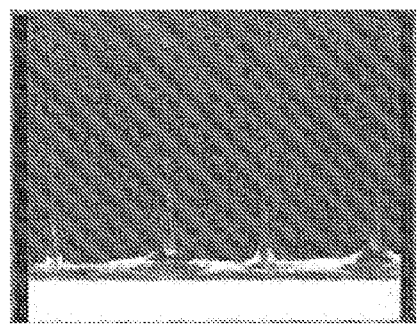
FIGS. 9A-D illustrate some embodiments of the invention with different sheath and core slitwidths.
Figure 9B:
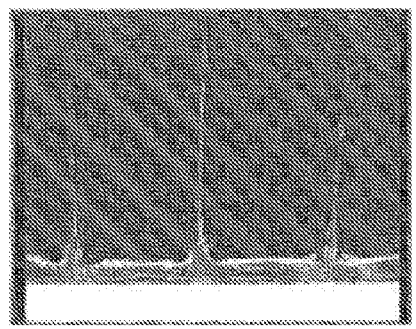
Figure 9C:
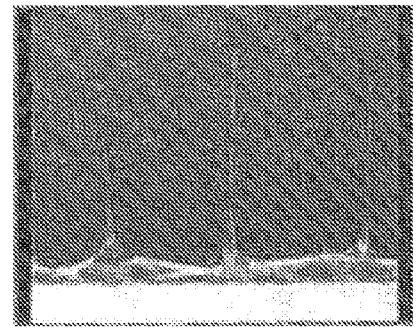
Figure 9D:
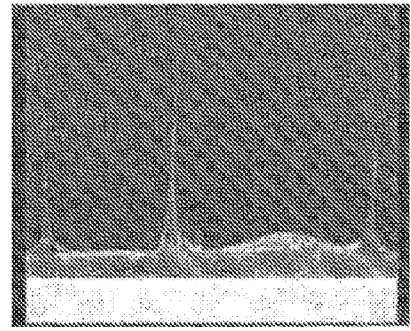

In various embodiments, the formation of the core-sheath Taylor cones and/or jets is controlled via the manipulation of various parameters which control the shear stress between the sheath and core solutions. The shear stress may be varied by changing the geometry of the slit fixtures, velocities, or viscosities of the core and/or sheath solutions. For example, if the flow velocity of the sheath solution is greater than that of the core solution at the exit point of the slit surfaces, distinct core-sheath Taylor cones may be formed. The flow velocities of the solutions depend on the volumetric flow rates and the surface areas, as given in Equations (1) and (2), where $Q_{sheath}$ and $Q_{core}$ represent the flow rates of the sheath and core solutions, respectively; $d_{sheath}$ and $d_{core}$ are the widths of the sheath and core slits, respectively, and $L_{sheath}$ and $L_{core}$ are the lengths of the sheath and core slits, respectively (as shown in FIG. 5). Accordingly, the flow velocities of the sheath and/or core solutions may be manipulated by changing the volumetric flow rates and/or the slit geometries thereof.

$$v_{total} = \frac{Q_{sheath} + Q_{core}}{d_{sheath} \times L_{sheath}} \quad (1)$$

$$v_{core} = \frac{Q_{core}}{d_{core} \times L_{core}} \quad (2)$$

Sheath Flow Rate

In various embodiments, the flow velocities of the sheath and core solutions are varied based on the variations in the flow rates thereof while maintaining the slit geometry. In one embodiment, the slit-fixture is comprised of two triangular shaped hollow troughs that are aligned to a single vertical plane to form a one-dimensional slit-surface (FIG. 2) The lengths of the sheath and core slits are 41 mm and 35 mm, respectively, and the widths of the sheath and core slits are 2.2 mm and 0.6 mm, respectively. Referring to Table 1, in one embodiment, the core flow rate is set constant (e.g., at 20 mL/h) while the sheath flow rate is varied from 20 mL/h to 200 mL/h to manipulate the formation of the Taylor cones (Note: The conditions used in this and experiments following corresponds to flow rates of up to 300 ml/h, resulting in significantly higher volumetric throughput relative to needle-based systems). As shown in FIG. 6A-D, the most distinct core-sheath jets (as visualized by a clear delineation between the core and sheath solutions in the Taylor cone due to the presence of dexamethasone in the core) occur for condition A where the sheath flow rate is ten times larger than the core flow rate (or the total velocity is approximately 2.5 times greater than the core velocity); whereas no distinct core-sheath jets are discernible for condition D where the sheath flow rate is roughly the same as the core flow rate (or the total velocity is approximately 2.25 times less than the core velocity). Accordingly, varying the sheath flow rate and thereby changing the relative ratio of the sheath solution velocity to core solution velocity effectively facilitates the formation of the core-sheath Taylor cones: a higher likelihood of generating the Taylor cones occurs when a ratio of the sheath flow velocity to the core flow velocity is larger.

FIGS. 7A-D depict typical fibers that are produced using the system described above. The diameter of the fibers are approximately 2-4 micron, which is within the order of magnitude expected for electrospun fibers. FIGS. 7A-D also include scanning electron micrographs of fiber cross-sections illustrating the encapsulation of dexamethasone within a sheath polymer.

Core Flow Rate

Referring to Table 2, in another embodiment, the sheath flow rate is kept constant while the core flow rate is varied. Specifically, the sheath flow rate was set to 200 ml/h while the core flow rate was modulated from between 20 to 100 ml/hr. The same polymer solutions were used as described previously. Again, when the sheath flow velocity is greater than the core solution flow velocity, the core-sheath Taylor cone formation has a higher probability of being distinct (FIGS. 8A-F). In another embodiment, the core flow rate was kept constant at 20 ml/hr and the sheath flow rate was varied from 200 ml/hr (forming a distinct core-sheath) to 100 ml/hr (forming a distinct core-sheath) to 40 ml/hr (forming a non-distinct core-sheath The core-sheath fiber formation may thus be manipulated by varying of the flow rates of the sheath and/or core solutions.

Slit Fixture Geometry

Core Slit Width

As shown in Eqs. (1) and (2), the velocities of the core and sheath solutions depend on the slit fixture geometry (e.g., the widths and/or lengths of the core and/or sheath slits). In various embodiments, the lengths of the sheath and core slits (i.e., $L_{sheath}$ and $L_{core}$, respectively) are approximately equal such that the formation of the slits across the entire fixture is the same in order to reduce the manufacturing complexity. As a result, the widths of the sheath and core slits are the primary variables in the slit geometry that may be altered to manipulate the flow velocities of the solutions. In one embodiment, the width of the core slit is varied while that of the sheath slit is fixed at 2.2 mm; the sheath flow rate is set to be constant at 200 mL/h while the core flow rate is adjusted as listed in Table 3. As indicated in Eq. (2), the core flow velocity is greater in a narrower core slit at a given core flow rate (also shown in the shaded squares of Table 3). Because the core-sheath jets are formed when the velocity of the core solution is smaller than that of the sheath solution, the maximum core flow rate that may be able to generate distinct core-sheath Taylor cones for a narrower core slit is smaller than that of a wider core slit. For example, referring to Table 3, a core flow rate of 5 mL/h is sufficient for a core slit having a width of 0.3 mm to form distinct Taylor cones, whereas a core flow rate of 20 mL/h is required to form distinct Taylor cones for a core slit having a width of 0.9 mm. The width of the core slit may further impact the flow of the sheath solution. For example, utilization of the 0.9 mm-wide core slit may leave little space for the sheath fluid flowing through the 2.2 mm-wide sheath slit (because the wall thickness of the core slit may be as thick as 0.3 mm). Accordingly, in one embodiment, the core slit width is carefully chosen such that the flow of the sheath fluid is not impeded.

Sheath Slit Width

In another embodiment, the width of the sheath slit varies from 1.5 mm to 3 mm while the width of the core slit is fixed at 0.6 mm and the flow rates of the sheath and core solutions are set constant at 200 mL/h and 20 mL/h, respectively. Again, because the core-sheath jets are formed when the velocity of the sheath solution is larger than that of the core solution, the minimum sheath flow rate capable of generating distinct core-sheath Taylor cones for a wider sheath slit is greater than that of a narrower sheath slit, as shown in Table 4. Note that the velocity of the sheath solution being greater than that of the core solution is necessary for formation of the core-sheath Taylor cones; this, however, may not be the only criteria. For example, a larger difference between the sheath and core velocities may result in easier formation of the distinct core-sheath cone and/or jet structure.

Theoretically, the maximum electric field (E) attainable for a wedge shaped conductor depends upon the slit width (d), and wedge angle (α), as described by Eq. 3, where $V_0$ is the applied voltage and R is a distance above the jet. Equation (3) indicates that the electric field is inversely proportional to the width of the slit. Table 5 depicts that a wider sheath slit may result in lower jet stability at a constant voltage (e.g., 85 kV); this agrees with the theoretical prediction that the slit geometry may affect the stability of core-sheath jet induced by the electrical field. A higher voltage may be required to produce stable jets when wider slits are employed. Referring to Table 6, in various embodiments, when a wider sheath slit is used, a higher voltage is required to generate a larger number of stable jets.

$$E \sim \frac{V_0}{R}\left(\frac{R}{d}\right)^{\pi/\alpha-1} \quad (3)$$

Sheath Slit Width and Core Slit Width

In various embodiments, the widths of the sheath and core slit fixtures are both varied, e.g., reduced to 1.5 mm and 0.3 mm, respectively. The flow rates of the sheath and core solutions may also be changed such that the flow velocities thereof remain the same as that of the solutions flowing in slits having larger width dimensions (e.g., sheath slit width of 2.2 mm and core slit width of 0.6 mm). For example, as shown in Table 7, the flow rates of the sheath and core solutions are changed to 140 mL/h and 10 mL/h, respectively, in the smaller slits (i.e., sheath slit width of 1.5 mm and core slit width of 0.3 mm) to match the flow velocities of 0.68 mm/s and 0.27 mm/s of the sheath and core solutions, respectively, generated using larger slits (i.e., sheath slit width of 2.2 mm and core slit width of 0.6 mm) and greater flow rates (i.e., 200 mL/hr and 20 mL/hr for the sheath and core solutions, respectively). These results indicate that electrospinning apparatus design parameters in general, and specifically a smaller sheath slit area or larger core slit area, can affect the quality of sheath and/or core solution into Taylor cones and/or electrospun fibers. Without wishing to be bound by any theory, it is believed that modifying the relative areas of the core and/or sheath slits can result in higher sheath velocities relative to core velocities for a given core or sheath flow rate. This in turn enables the formation of core-sheath fibers where the core flow rate is higher and, therefore, the core makes up a larger proportion of the fiber (or electrosprayed particle) cross-sectional area, diameter or volume. Again, the formation of the core-sheath Taylor cones occurs when the total velocity is relatively greater than the core velocity; this is applicable to slit fixtures having various slit widths (FIGS. 9A-D). Note that Taylor cones are not observable for condition D of Table 7, even though the sheath flow rate is much greater than the core flow rate; this again indicates that it is the velocity difference, not the flow rate difference, between the core and sheath solutions that controls the formation of the core-sheath fibers.

Core Slit Height

Figure 10A:
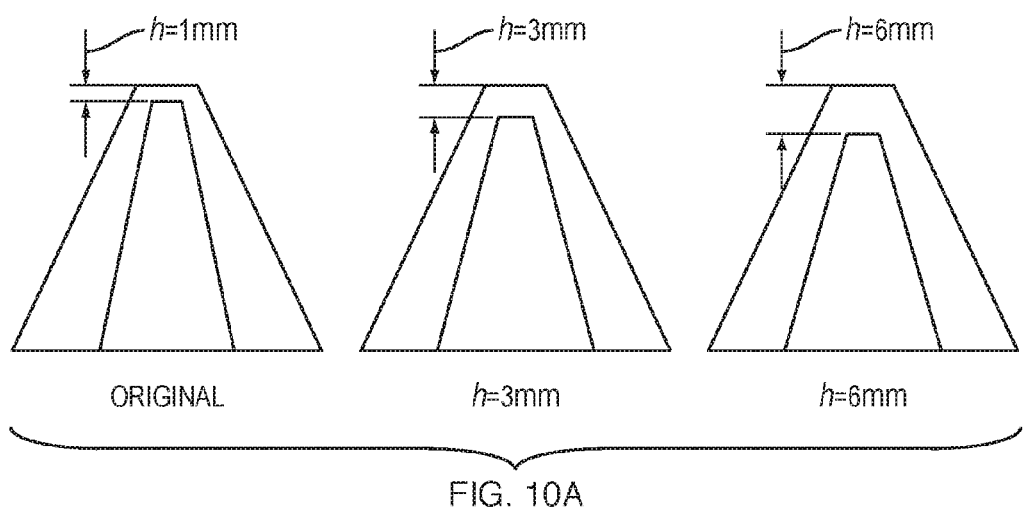
FIG. 10A includes exemplary schematic illustrations of embodiments of the invention wherein the depth of the core slit surface varies relative to the sheath slit surface.

Referring to FIG. 10A, in some embodiments, the height spacing between the apex of the core and sheath slit fixtures varies from 1 mm to 6 mm. Using sheath and core flow rates of 200 and 20 ml/h, respectively, and an applied voltage of 75 kV, a larger spacing resulted in less distinct core-sheath Taylor cones, as shown in FIG. 10B; this indicates that an optimal core and sheath slit spacing exists that benefits the shear forces applied on the core fluid by the sheath fluid to produce successful viscous entrainment.

Viscosities of the Solutions

Figure 11:
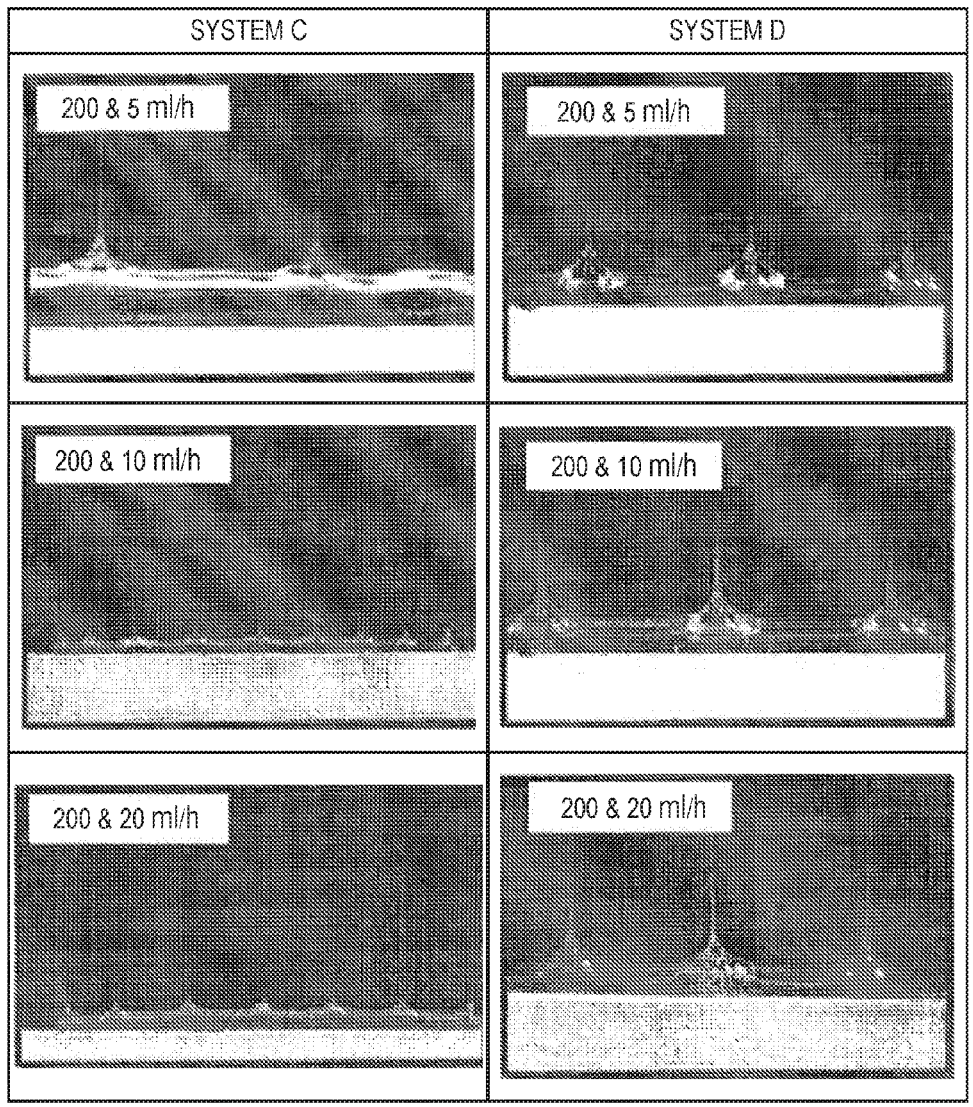
FIG. 11 illustrates some embodiments of the invention wherein material viscosity is varied to form core-sheath fibers.

Variations in the fluid properties (e.g., viscosity) of the core and/or sheath solutions may result in significant changes to the shear stress, thereby affecting the formation of the core-sheath Taylor cones. In various embodiments, the viscosity of the sheath solution is varied, for example, by adjusting the weight percentage of PCL solution. Referring to Table 8, the viscosity of the sheath solution changes from approximately 280 cP to 760 cP when the PCL content in 6:1 (by vol) $CHCl_3$:MeOH is changed from 12 wt % (system C) to 16 wt % (system D), respectively; the viscosity of the core solution is fixed at roughly 500 cP in both systems. In one implementation, the core flow rate varies from 5 mL/hr to 20 mL/hr and the flow rate of the sheath solution is kept constant at 200 mL/h. As shown in FIG. 11, at the same flow rate conditions, the core-sheath formation and morphology of the Taylor cones is more distinct when the viscosity of the sheath solution is larger than that of the core solution (system D). Again, generation of the distinct Taylor cones is facilitated in the systems having a larger viscosity of the sheath solution compared with that of the core solution. Accordingly, generation of the Taylor cones and formation of the fibers may be manipulated via both flow velocities and fluid viscosities of the solutions. Note that although the viscosity of the sheath solution is tuned by adjusting the weight percentage of PCL, one of ordinary skill in the art will understand that the viscosity of the sheath and/or core solution may be adjusted using other approaches, such as heating and cooling of the solutions or utilization of polymers having different molecular weights.

Core Sheath Fiber Applications

The invention described herein can be used to manufacture any type of core sheath structure that is traditionally fabricated via a needle setup. Broadly speaking, core-sheath electrospinning is employed in situations to: (1) create bicomponent fibers; (2) to encapsulate a particle; (3) to create fibers from traditionally unelectrospinnable materials; (4) to create hollow fibers. These types of fibers have applications in a variety of fields including drug delivery, tissue engineering, diagnostics, electronics, energy storage, textiles, etc.

Bicomponent fibers fabricated using core-sheath electrospinning contain a core material that is different than the sheath material. This is desirable in instances where it is desired to combine the properties of two different types of polymers into a single fiber. These properties can be mechanical, chemical, biological, degradation, solubility, etc. in nature. For example, a core-sheath fiber consisting of PCL as the core and collagen as the sheath relies on the PCL component to impart mechanical integrity to the fiber while the collagen (being biological) imparts biocompatibility when implanted in vivo. Another example is bicomponent fibers with different solubility characteristics wherein either the core or the sheath acts as a sacrificial layer (this method can also be used to create hollow fibers—see below). In another example, bicomponent fibers with piezoelectric properties can be made with PVDF sheath and an intrinsically conductive polymer core. Alternatively, the bicomponent fibers can consist of a solid sheath but contain a non-solid core (e.g. liquid). In another embodiment, the components of the sheath and the core in the biocomponent fiber can react during electrospinning or after fibers have formed. Bicomponent fibers are also useful in situations whereby cost of materials is an issue. For example, less expensive material can be used in the core while a more expensive material is used in the sheath. This allows less sheath material to be used, thus conserving costs. Another example is bicomponent fibers having a biodegradable core material (e.g., PLGA in hexafluoroisopropanol electrospun at a flow rate of 40 ml/hr) and a biostable sheath material (e.g., nylon 6,6 in hexafluoroisopropanol electrospun at a flow rate of 200 ml/hr), as shown in FIG. 14.

Core-sheath fibers can be used to encapsulate any particle, either in dissolved or particulate form. Any number of particles, biologic, organic, organometallic, ceramic, and inorganic compounds can theoretically be encapsulated and include but are not limited to the following: small molecule chemicals, proteins, fluorophores, metals, hydrides, microparticles, plastics, carbon black, carbon nanotubes, graphene, fluropolymers (e.g.: Teflon), liposomes, etc.

Figure 12A:
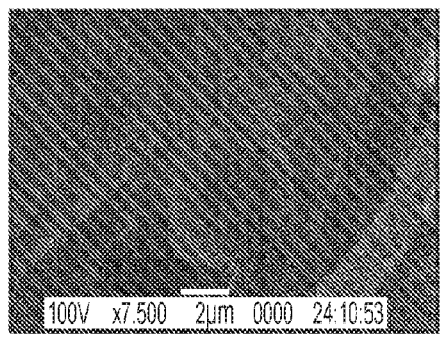
FIG. 12A-D illustrates fibers and patches formed according to methods of the invention.
Figure 12B:
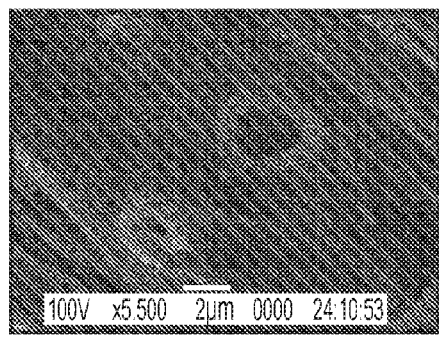
Figure 12C:
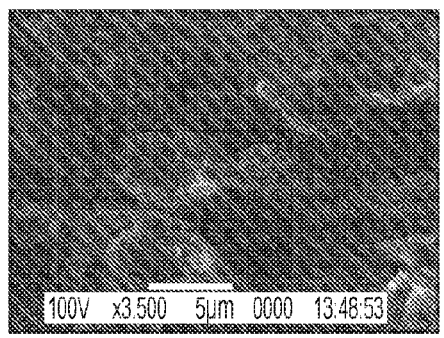
Figure 12D:
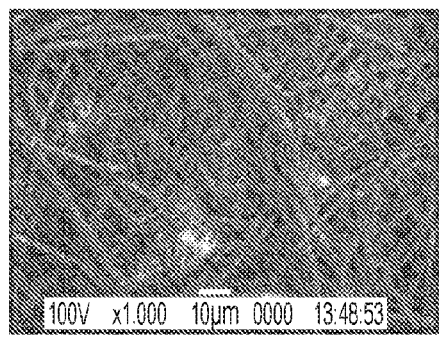

Using core-sheath electrospinning, materials that are traditionally unelectrospinnable can be co-electrospun into fibers using a polymer that is electrospinnable. The unelectrospinnable material can exist as a component in the resulting bi-component fiber system or the electrospinnable material can be removed after fiber fabrication, leaving behind only the unelectrospinnable material. The unelectrospinnable material can either be in the sheath or the core. Depending on the unelectrospinnable material can be used to coat a core carrier polymer, as described below with Teflon AF. Examples of unelectrospinnable materials include resins, latent curatives, phase change materials, certain inherently conducting polymers, sol-gels, Teflon AF, and prepolymers and thermosetting polymers that require cross-linking such as PGS, PPF, PLCL, PGCL, PDMS, and/or polyurethanes, polyesters, polyimides, epoxies, and the like. An example in which the unelectrospinnable material is the sheath is with Teflon AF. Teflon AF by itself is unelectrospinnable due to low conductivity of the solution; however, using a core carrier polymer such as PCL, core sheath fibers can be fabricated that consist of the core polymer being coated by the Teflon AF. In other instances, the unelectrospinnable material is incorporated into the core. For example, a core-sheath fiber that consists of a prepolymer in the core. Once the fibers are formed, the fiber is subjected to the curing step (e.g. heat, UV, etc), that results in the prepolymer cross-linking and becoming solid. The sheath material can then be removed if desired, to leave behind the core polymer as a fiber. An example of this is with PDMS, which can be electrospun in the core with a polymer sheath. After fabrication, the fibers can then be exposed to heat allowing for the PDMS to cure and harden, forming a bicomponent fiber of PDMS and sheath polymer. The polymer sheath can then be removed if desired (e.g. by dipping in solvent), to leave behind PDMS fibers. In an alternate embodiment, the unelectrospinnable material can be used to influence the formation and resulting quality of the fibers that are produced. For example, an unelectrospinnable salt solution can be used as the sheath in order to help drive down the fiber diameter of the core polymer that is electrospun. In an example of using the present invention to electrospin materials that are traditionally unelectrospinnable, a core-sheath fiber was made with a sheath polymer system of 3.5 wt % 85/15 PLGA in 6:1 (by volume) chloroform:methanol, and a core polymer of PDMS (Sylgard 184, a two-part liquid system consisting of a pre-polymer and a cross-linking agent mixed in a 10:1 mass ratio), as shown in FIG. 12C. The sheath and core solution flow rates were 200 ml/hr and 20 ml/hr, respectively. The fibers were spun into a mesh approximately 1 mm in thickness, which was placed in an over at 100° C. for three hours. To optionally yield a homogeneous fiber (i.e., a fiber that is not core-sheath, but instead a single cross-sectional structure) as shown in FIG. 17, the mesh was immersed in chloroform for one hour to allow the PLGA sheath to dissolve to yield PDMS fibers. In alternative embodiments of forming PDMS fibers, water-soluble polymers such as PEO, PVA, gelatin or dextran are used for the sheath material, which is removed from the electrospun fibers using aqueous means. In other alternative embodiments, other two-part PDMS systems can be cured by exposure to UV light or cross-linked into elastomers through free radical, condensation, or other reactions; or one-part PDMS can be used that cure upon exposure to moisture in the atmosphere or upon photocuring. In other alternative embodiments, the sheath is removed by degradation instead of solvent dissolution, or is etched away using an acid or other etchant, or if sufficiently brittle, is mechanically disrupted to fracture and separate the sheath from the core.

Core-sheath fibers can be used to create hollow fibers. Hollow fibers can be efficient as air filled fibers for clothing insulation. As well, the temporary nature of the core can allow for sufficient reinforcement of the material for weaving or post-processing and upon removal, leave behind ultralight but strong fabrics. Biomedical, electronic, optical, sensing, energy storage, and catalysis applications, for example) can utilize hollow fibers, which have excellent insulative properties. Hollow fibers can allow for better nutrient and gas exchange for tissue engineering applications. Hollow fibers can be created using oil as the core and after fabrication, removal of the oil by extraction in solvents such as octane or hexane. Hollow ceramic (e.g., $SiO_2$, $SnO_2$, $Al_2O_3$, $ZnO$ and $TiO_2$) fibers via sol-gels of their alkoxide precursors can also be electrospun into hollow fibers. Alternatively, hollow fibers can also be created by using a water soluble or biodegradable polymer in the core and a non-water soluble or biostable polymer as the sheath. Subsequent extraction in water or exposure in vivo will remove the aqueous-soluble core. In general, hollow fibers can be created from core-sheath fibers in which the core material dissolves in the extraction solvent, whereas the sheath material does not. An example of this concept was carried out using 2 wt % polyethylene oxide (PEO) in 6:1 (by volume) chloroform:acetonitrile as the core material and 3.5 wt % PLGA in hexafluoroisopropanol as the sheath material. The sheath flow rate was 200 ml/hr while the core flow rate was 20 ml/hr, using the slit-surface needleless electrospinning system. The water-soluble PEO core was subsequently dissolved to yield a hollow PLGA fiber, as shown in FIG. 12B. In other example, PLGA is used for the core material and nylon in the sheath, followed by the use of chloroform to dissolve the PLGA to yield hollow nylon fibers.

The systems and methods described herein can be modified to novel electrospun or electrosprayed articles. In one example, the polymer solutions described above are diluted, such that core-sheath micro or nanoparticles are generated at high throughput by electrospraying. In another example, the core and/or sheath solutions supplied to an electrospinning apparatus are generated by melting, rather than dissolving, a polymer composition. In still another example, different core and/or sheath solutions are delivered to different segments along the length of the slit, thereby forming, in a single apparatus, at least two different fiber types characterized by different core and/or sheath compositions, and facilitating the generation of higher-order structures such as yarns, ropes, or patches that incorporate the different fiber types.

Other embodiments include a sheath material with a lower melting point than the core material such that heating a mesh of electrospun fibers results in melting of the sheath material (but not the core material) at the fiber cross-over points in the mesh without compromising the integrity of the overall mesh.

Still other embodiments make use of a sheath material that has the ability to absorb or repel water of other fluids while the core material provides mechanical integrity.

The systems and methods described above are used, in some instances, to create very small (nm) diameter-sized fibers, which are otherwise difficult to produce. This can be achieved, for example, by having a high sheath flow rate relative to the core flow rate, resulting in a core-sheath fiber with a very small core. Upon sacrificial removal of the sheath layer, the small core fiber remains.

The fibers of the present invention have numerous applications in medicine. For example, fibers and meshes of the present invention can be used as supports for rotator cuff repair or similar orthopedic applications at the tissue/suture interface; as protein microarrays with low limits of detection due to increased surface area with fibers; as novel hydrophobic filters that are thermostable; as water-repellant but breathable lightweight fabric; as medical bandages for burns or wounds that allow gas exchange and exudates to fill the porosity therein; as tissue engineering scaffolds; as drug delivery vehicles; as sensors and diagnostic elements; as self-healing coatings; as filter elements; as textiles; in clean tech applications; and in numerous other medical and non-medical applications.

The fibers of the present invention may be fabricated by a wide range of polymeric materials, as described herein. Examples not previously identified include a core-sheath fiber structure formed from a sheath material of 85/15 L-PLGA in chloroform:methanol and a core material of 70/30 PCL/dexamethasone in chloroform:methanol (where PCL is polycaprolactone, and the core material may or may not include a therapeutic agent); sheath materials of 12 wt % PCL and 16 wt % PCL in chloroform:methanol and a core material of 12 wt % PCL in 6:1 (by volume) chloroform:methanol containing 30 wt % dexamethasone relative to PCL.

Advantages of the Invention as it Relates to High Throughput Open-Bath Monofiber Fabrication Systems Current high throughput methods to create monofibers utilize a rotating drum or wire bundle mostly immersed in an open bath of polymer solution, or free surface electrospinning. The operation requires that the solution have an optimal viscosity and surface tension such that solution can be drawn up onto the surface of the drum or wire as it rotates. The open nature of the bath solution results in an inherent limitation in which solvent evaporation occurs, resulting in the polymer solution becoming more viscous over time. The closed-system of the needleless system does not have this inherent disadvantage of solvent evaporation. The requirement of viscosity along with solvent evaporation can potentially limit the versatility of polymer/solvent systems that can be electrospun using these methods. For example, certain solvent/polymers potentially cannot be electrospun because the evaporation rate is too quick or they do not impart rheological properties amenable to being drawn up onto the drum surface.

The solution viscosity that works with open bath free surface electrospinning systems are relatively lower than that used with the needleless fixture described herein. Thus, electrospinning of polymer suspensions will be more difficult, due to more settling of the particles in less viscous solutions. It is also less likely that a particle with weight can be dragged up onto the surface of the rolling drum. Additionally, our needleless setup is capable of electrospraying solutions.

Another advantage of our system relative to the open bath free surface system is that there is no material waste because all of the polymer solution can be pushed through the slit fixture and electrospun into fibers. This is not possible in the case of open bath systems, which requires the rotating mandrel to be rotating in a bath of solution in order for fibers to be formed. Therefore, there will always be material that is not consumed. Moreover, the efficiency of solution consumption of the disclosed invention relative to the open bath system should be greater in the needleless fixture. The amount of solution/material that is consumed (electrospun) per unit of time using the drum and open bath is relatively less than the amount that can be consumed in the same amount of time via the needleless fixture described herein, since only a thin layer of solution is drawn up during each rotation and not all of the solution is electrospun.

The operation of the open bath free surface electrospinning requires that spinning and subsequent fiber collection occurs upwards. Our system is capable of electrospinning and fiber collection in any direction. For example, using our process, fiber collection can occur upside-down. This can be beneficial in circumstances in which one would want to collect fibers downwards towards/into a bath of water for example.

In electrospinning, each Taylor cone that forms leads to one long continuous fiber that gets collected. In a typical operation of the needleless fixture, there are approximately 10 jets that form along the length of the slit; the collected mesh is therefore comprised of 10 very long fibers intertwined with one another. In contrast, during the operation of the open bath free surface electrospinning, hundreds of jets form and disappear with each rotation of the drum, thus the resulting mesh consists of thousands of relatively short fibers. This may result in relatively mechanically weaker meshes compared to less number of longer fibers that are intertwined.

The fibers that are produced using the open bath system arise from Taylor cones that spontaneously form. Thus, the fiber diameter is likely to be primarily a function of the solution properties only. The design of the needleless fixture contains processing parameters that potentially enable greater control over fiber diameter. For example, in addition to the solution properties, solution flow rates can be manipulated to control fiber diameter size. Furthermore, the number of jets produced can also be controlled, which could lead to differences in fiber diameter size.

Another potential advantage of the needleless invention described herein relates to maintenance of sterility. The open bath nature of current high throughput electrospinning methods is more easily susceptible to contamination from particles or fibers that are not collected properly. Conversely, the closed system of our invention mitigates any of these concerns.

The phrase "and/or," as used herein should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used in this specification, the terms "substantially," "approximately" or "about" means plus or minus 10% (e.g., by weight or by volume), and in some embodiments, plus or minus 5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

The term "consists essentially of" means excluding other materials that contribute to function, unless otherwise defined herein. Nonetheless, such other materials may be present, collectively or individually, in trace amounts.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

TABLE 1

Variation of the flow rate of the sheath solution

| Condition | Sheath Flow Rate (ml/h) | Core Flow Rate (ml/h) | Total velocity (mm/s) | Core Velocity (mm/s) | Total velocity greater than Core Velocity? | Distinct Core-Sheath Taylor Cones Formed? |
|---|---|---|---|---|---|---|
| A | 200 | 20 | 0.68 | 0.27 | Yes | Yes |
| B | 100 | 20 | 0.37 | 0.27 | Yes | Yes |
| C | 40 | 20 | 0.19 | 0.27 | No | No |
| D | 20 | 20 | 0.12 | 0.27 | No | No |

TABLE 2

Variation of the flow rate of the core solution

| Condition | Sheath Flow Rate (ml/h) | Core Flow Rate (ml/h) | Total velocity (mm/s) | Core Velocity (mm/s) | Total velocity greater than Core Velocity? | Distinct Core-Sheath Taylor Cones Formed? |
|---|---|---|---|---|---|---|
| A | 200 | 20 | 0.68 | 0.27 | Yes | Yes |
| B | 200 | 30 | 0.71 | 0.40 | Yes | Yes |
| C | 200 | 40 | 0.74 | 0.53 | Yes | Yes |
| D | 200 | 60 | 0.80 | 0.80 | No | No |
| E | 200 | 80 | 0.86 | 1.06 | No | No |
| F | 200 | 100 | 0.92 | 1.32 | No | No |

TABLE 3

Variation of the width of the core slit

| | Core Slit Size (Sheath Slit = 2.2 mm) | | | | | | | | |
|---|---|---|---|---|---|---|---|---|---|
| | 0.3 mm | | | 0.6 mm | | | 0.9 mm | | |
| Core Flow Rate | Core Velocity (mm/s) | Total Velocity (mm/s) | Quality of Core/Sheath Taylor Cone | Core Velocity (mm/s) | Total Velocity (mm/s) | Quality of Core/Sheath Taylor Cone | Core Velocity (mm/s) | Total Velocity (mm/s) | Quality of Core/Sheath Taylor Cone |
| 5 ml/h | 0.13 | 0.63 | Distinct | N/A | N/A | N/A | N/A | N/A | N/A |
| 10 ml/h | 0.26 | 0.65 | Distinct | N/A | N/A | N/A | N/A | N/A | N/A |
| 20 ml/h | 0.53 | 0.68 | Not Distinct | 0.27 | 0.68 | Distinct | 0.18 | 0.68 | Distinct |
| 30 ml/h | N/A | N/A | N/A | 0.40 | 0.71 | Distinct | 0.26 | 0.71 | Distinct |
| 40 ml/h | N/A | N/A | N/A | 0.53 | 0.74 | Distinct | 0.35 | 0.74 | Distinct |
| 60 ml/h | N/A | N/A | N/A | 0.80 | 0.80 | Not Distinct | 0.53 | 0.80 | Not Distinct |

TABLE 4

Variation of the width of the sheath slit

| Core Slit Width | 0.6 mm | | | |
|---|---|---|---|---|
| Sheath Slit Width | 1.5 mm | 2.2 mm | 3.0 mm | |
| Solution Flow Rates (ml/h) | 200:20 | 200:20 | 200:20 | 300:20 |
| Total velocity (mm/s) | 1 | 0.68 | 0.5 | 0.72 |
| Core Velocity (mm/s) | 0.26 | 0.26 | 0.26 | 0.26 |
| Total velocity > Core Velocity | Yes | Yes | Yes | Yes |
| Quality of core/sheath Taylor cone | Distinct | Distinct | Not Distinct | Distinct |

TABLE 5

Jet stability at different sheath slit widths (V = 85 kV throughout)

| Core Slit Width | 0.6 mm | | |
|---|---|---|---|
| Sheath Slit Width | 1.5 mm | 2.2 mm | 3.0 mm |
| Solution Flow Rates (ml/h) | 100:20 | 100:20 | 100:20 |
| Jet Stability | High | High | Low |

TABLE 6

Jet number at different sheath slit width

| | Sheath Slit = 1.5 mm | | Sheath Slit = 2.2 mm | | Sheath Slit = 3.0 mm | |
|---|---|---|---|---|---|---|
| Sheath/core flow rates | 40/20 ml/hour | 100/20 ml/hour | 40/20 ml/hour | 100/20 ml/hour | 40/20 ml/hour | 100/20 ml/hour |
| 90 kV | 13 jets | 11 jets | — | — | | |
| 85 kV | 11 jets | 11 jets | 8 jets | 8-9 jets | 6 jets | 4-6 jets |
| 75 kV | 10 jets | 9 jets | 8 jets | 8-9 jets | — | 2 jets |
| 70 kV | 9 jets | — | — | — | — | — |
| 65 kV | 8 jets | — | 8 jets | 7-8 jets | — | — |

TABLE 7

Flow rates and calculated velocities of slit fixtures having small widths

| Condition | Sheath Flow Rate (ml/h) | Core Flow Rate (ml/h) | Total velocity (mm/s) | Core Velocity (mm/s) | Total velocity greater than Core Velocity? | Distinct Core-Sheath Taylor Cones Formed? |
|---|---|---|---|---|---|---|
| A | 140 | 10 | 0.68 | 0.27 | Yes | Yes |
| B | 142 | 15 | 0.71 | 0.40 | Yes | Yes |
| C | 144 | 20 | 0.74 | 0.53 | Yes | Yes |
| D | 147 | 30 | 0.80 | 0.80 | No | No |

TABLE 8

| System | Solution | Viscosity (cP) |
| --- | --- | --- |
| C-Sheath | 12 wt % PCL in CHCl$_3$:MeOH (6:1 vol:vol) | 280 |
| D-Sheath | 16 wt % PCL in CHCl$_3$:MeOH (6:1 vol:vol) | 760 |
| Core solution for both systems | 12 wt % PCL in CHCl$_3$:MeOH (6:1 vol:vol), 30% Dexamethasone loading relative to polymer mass in core solution | 500 |

What is claimed is:

1. A method for electrospinning a core-sheath fiber, comprising the steps of:
    providing an electrospinning apparatus comprising a first vessel having a first elongate aperture, a second vessel having a second elongate aperture aligned with the first elongate aperture, and a collector positioned at a distance from the first and second elongate apertures;
    flowing a first flowable material comprising a core polymer into the first vessel;
    flowing a second flowable material comprising a sheath polymer into the second vessel; and
    applying an electric potential between the collector and the first and second apertures, the electric potential having a magnitude and an orientation effective to form at least one electrospinning jet,
    wherein at least one parameter selected from the group consisting of a width of the first or second aperture, a length of the first or second aperture, and a flow rate of the first or second flowable material is chosen to optimize a shear stress generated at a fluid interface between the first and second flowable materials during the application of the potential, such that a desired ratio of core and sheath polymers is incorporated into the at least one electrospinning jet.

2. The method of claim 1, wherein the first flowable material exits the first aperture at a first velocity and the second flowable material exits the second aperture at a second velocity.

3. The method of claim 2, wherein the second velocity is about 1.3 times greater than the first velocity.

4. The method of claim 2, wherein a ratio of the first velocity to the second velocity varies during the application of the electric potential.

5. The method of claim 1, wherein the first aperture has a first width and the second aperture has a second width.

6. The method of claim 5, wherein the first width is about half of the second width.

7. The method of claim 1, wherein a length of the first elongate aperture is equal to a length of the second elongate aperture.

8. The method of claim 1, wherein a length of the first elongate aperture is less than a length of the second elongate aperture.

9. The method of claim 1, wherein the first vessel is nested within the second vessel and the first and second elongate apertures are parallel to one another such that material ejected from the first elongate aperture in the at least one electrospinning jet passes through the second elongate aperture as well.

10. The method of claim 9, wherein the first and second elongate apertures are not coplanar, and are offset by a distance of between about 1 and 6 mm.

11. The method of claim 10, wherein the first vessel and the first elongate aperture are submerged in the second flowable material.

* * * * *